United States Patent
Song et al.

(10) Patent No.: US 12,522,727 B2
(45) Date of Patent: Jan. 13, 2026

(54) ALKALINE BATTERY GASKET

(71) Applicant: Toray Industries, Inc., Tokyo (JP)

(72) Inventors: Yetao Song, Nagoya (JP); Motoharu Yoshikawa, Nagoya (JP); Masaru Akita, Nagoya (JP); Kotaro Ryuo, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 710 days.

(21) Appl. No.: 17/910,034

(22) PCT Filed: Feb. 25, 2021

(86) PCT No.: PCT/JP2021/007129
§ 371 (c)(1),
(2) Date: Sep. 8, 2022

(87) PCT Pub. No.: WO2021/187044
PCT Pub. Date: Sep. 23, 2021

(65) Prior Publication Data
US 2023/0107144 A1 Apr. 6, 2023

(30) Foreign Application Priority Data

Mar. 19, 2020 (JP) .................. 2020-049204

(51) Int. Cl.
*C08L 77/06* (2006.01)
(52) U.S. Cl.
CPC ......... *C08L 77/06* (2013.01); *C08L 2205/025* (2013.01); *C08L 2205/03* (2013.01)
(58) Field of Classification Search
CPC ...... C08L 77/06; C08L 23/04; C08L 23/0815; C08L 51/06; C08K 3/34; C08K 5/053
See application file for complete search history.

(56) References Cited

U.S. PATENT DOCUMENTS

| 2006/0222935 | A1* | 10/2006 | Takahashi | H01G 11/72 429/211 |
|---|---|---|---|---|
| 2013/0200308 | A1 | 8/2013 | Lee et al. | |
| 2017/0222272 | A1* | 8/2017 | Takami | H01M 4/5825 |
| 2018/0370202 | A1* | 12/2018 | Niedersüss | B32B 27/08 |
| 2020/0091471 | A1 | 3/2020 | Miyata et al. | |

FOREIGN PATENT DOCUMENTS

| CN | 104497566 | A | | 4/2015 | |
|---|---|---|---|---|---|
| CN | 106117813 | A | | 11/2016 | |
| CN | 109075274 | | | 12/2018 | |
| JP | 2001-202935 | A | | 7/2001 | |
| JP | 2006-219563 | A | | 8/2006 | |
| JP | 2006-299216 | A | | 11/2006 | |
| JP | 2008-103221 | A | | 5/2008 | |
| JP | 4894168 | B2 | * | 3/2012 | |
| JP | 2015-026477 | A | | 2/2015 | |
| JP | 2018181825 | A | * | 11/2018 | ............ H01M 10/24 |

OTHER PUBLICATIONS

Extended European Search Report dated Mar. 15, 2024, of counterpart European Patent Application No. 21772119.0.
International Search Report dated Apr. 27, 2021 in counterpart International Application No. PCT/JP2021/007129.
Written Opinion dated Apr. 27, 2021 in counterpart International Application No. PCT/JP2021/007129.
Second Office Action dated Mar. 28, 2024, from counterpart Chinese Application 2021-80017291.3 with English translation.
"Plastic Molding Process," Compiled by Guangzhou Light Industry School of the Ministry of Light Industry, *China Light Industry Press*. p. 260, Apr. 1990 with English Translation.
Han Lin, "Theory, Application and Development of Polymer Products," *Elephant Publishing House*, p. 120, Feb. 1997, with English Translation.
"Plastics Handbook," Edited by Yinghong Ou, Beijing, *Ordnance Industry Press*, pp. 265 and 270, Feb. 1991, with English Translation.
First Office Action dated Nov. 29, 2023, of counterpart Chinese Patent Application No. 202180017291.3, along with an English translation.

* cited by examiner

*Primary Examiner* — Anthony J Frost
(74) *Attorney, Agent, or Firm* — DLA Piper LLP (US)

(57) ABSTRACT

An alkaline battery gasket includes a resin composition in which 50 to 95 parts by weight of a polyamide 610 resin (A) and 5 to 50 parts by weight of a polyethylene resin (B), based on 100 parts by weight of a total amount of the polyamide 610 resin (A) and the polyethylene resin (B), is blended, in which, in morphology of the resin composition observed by using transmission electron tomography, the polyamide 610 resin (A) forms a continuous phase, the polyethylene resin (B) forms a dispersed phase, and an average dispersion diameter of the dispersed phase is 1 nm or more and 1000 nm or less.

4 Claims, No Drawings

ALKALINE BATTERY GASKET

TECHNICAL FIELD

This disclosure relates to an alkaline battery gasket formed from a polyamide resin composition obtained by blending a polyamide resin 610 and a polyethylene resin.

BACKGROUND

Alkaline batteries are a type of batteries that operate by a redox reaction of zinc and manganese dioxide, and are produced in the form of cylinders, buttons and the like. For example, in an alkaline battery having a cylindrical shape, a power generation element is housed in a bottomed cylindrical positive electrode can that also serves as a positive electrode terminal and a positive electrode current collector. An opening of the positive electrode can needs to be sealed between it and a negative electrode terminal board with a gasket to prevent leakage of an electrolyte.

In addition, the alkaline battery needs to have a function (safety valve) to prevent an explosion caused by a battery short or the like, and a gasket having a thin part capable of bursting under a certain pressure or more is required. The pressure at which the gasket bursts is called burst strength.

Conventionally, a polyamide resin that can be easily formed has been used as a material for the gasket, but the polyamide resin has a difference in burst strength between an absolutely dry state and a water absorbing state due to its water absorption. Since the difference in strength means a variation in operating pressure of the safety valve in the usage environment, it has been required in recent years to prevent a change in strength. Further, the gasket used as a safety valve, which is a safety component, involves a step of inspecting foreign matters and air bubbles. As the detection accuracy for the foreign matters deteriorates when the transparency of the gasket is low in this step, high transparency is required.

To deal with this problem, for example, numerous technical improvements have been made to a polyamide 610 resin (JP-A-2015-26477 and JP-A-2018-181825), a polyolefin resin (JP-A-2001-202935), and a composite resin of a polyamide 610 resin and a polyolefin resin (JP '935 and JP-A-2008-103221).

Although a gasket containing a polyamide 610 resin having a low water absorption property as a main component, as in JP '477 and JP '825, tends to have a small difference in burst strength between an absolutely dry state and a water absorbing state, it is still insufficient.

In addition, a gasket containing a polyolefin resin disclosed in JP '935 has problems that the heat resistance is lower than that containing a polyamide resin, and thus the gasket is deformed by heat generation due to a battery short, and an electrolyte in the dry battery leaks.

Further, as in JP '935 and JP '221, the composite resin in which the polyolefin resin is dispersed in the polyamide 610 resin has a problem that the transparency is inferior to that of the gasket containing a polyamide resin alone.

It could, therefore, be helpful to provide an alkaline battery gasket including a polyamide resin composition having a small difference in burst strength between an absolutely dry state and a water absorbing state, is excellent in alkaline resistance, heat resistance, and light weight, and has transparency at a level that allows foreign matters to be inspected.

SUMMARY

We thus provide an alkaline battery gasket including a resin composition in which 50 to 95 parts by weight of a polyamide 610 resin (A) and 5 to 50 parts by weight of a polyethylene resin (B), based on 100 parts by weight of a total amount of the polyamide 610 resin (A) and the polyethylene resin (B), is blended, in which, in morphology of the resin composition observed by using transmission electron tomography, the polyamide 610 resin (A) forms a continuous phase, the polyethylene resin (B) forms a dispersed phase, and an average dispersion diameter of the dispersed phase is 1 nm or more and 1000 nm or less.

It is thus possible to obtain an alkaline battery gasket including a polyamide resin composition having a small difference in burst strength between an absolutely dry state and a water absorbing state, is excellent in alkaline resistance, heat resistance, and light weight, and has transparency at a level that allows foreign matters to be inspected.

The alkaline battery gasket can be stored for a long period of time and can operate an explosion-proof safety valve with stable accuracy regardless of the surrounding usage environment. In addition, it is easy to detect foreign matters in the production process, which leads to prevention of the risk of electrolyte leakage when the alkaline battery gasket is incorporated into a dry battery and prevention of the occurrence of a malfunction in which the safety valve operates under a pressure beyond an assumed pressure range.

DETAILED DESCRIPTION

Hereinafter, our gaskets will be described in detail.

Our polyamide resin composition forming an alkaline battery gasket contains a polyamide 610 resin (A) and a polyethylene resin (B).

The polyamide 610 resin (A) means a polymer having a chain skeleton obtained by polymerization using hexamethylenediamine as a diamine and sebacic acid as a dicarboxylic acid as polymerization monomers. By using the polyamide 610 resin (A), light weight, transparency, alkaline resistance, and heat resistance can be imparted. In addition, owing to low water absorption, a difference in burst strength between an absolutely dry state and a water absorbing state can be reduced.

A viscosity of the polyamide 610 resin (A) is not particularly limited, and it is preferable that the viscosity measured in accordance with JIS K 6933 (2013) based on ISO307 is in the range of 70 ml/g or more and less than 120 ml/g. The viscosity being 70 ml/g or more is preferred since compatibility with the polyethylene resin (B) is good, the transparency and the appearance of a formed product are excellent, and a certain level of alkaline resistance can be maintained. The viscosity being less than 120 ml/g is preferred since the difference in burst strength between an absolutely dry state and a water absorbing state can be reduced.

The terminal amino group concentration of the polyamide 610 resin (A) is not particularly limited, and a terminal amino group concentration of $1.0 \times 10^{-5}$ mol/g or more is preferred from the viewpoint of reactivity with the polyethylene resin (B). The terminal amino group concentration referred to here can be measured by dissolving a polyamide resin in an 85% phenol-ethanol solution, using thymol blue as an indicator, and titrating with an aqueous hydrochloric acid solution.

The terminal carboxyl group concentration of the polyamide 610 resin (A) is not limited, and a terminal carboxyl group concentration of $10.0 \times 10^{-5}$ mol/g or less is preferred since the alkaline resistance is excellent. The terminal carboxyl group concentration referred to here can be measured by heating and dissolving with benzyl alcohol, using a phenolphthalein indicator, and titrating with an aqueous potassium hydroxide solution having a normality of 0.02 N.

The polyethylene resin (B) means a homopolymer having a chain skeleton derived from ethylene. Copolymers with propylene or other alkenes, and synthetic rubber-based resins are excluded. By using the polyethylene resin (B), light weight and alkaline resistance can be imparted, and the difference in burst strength between an absolutely dry state and a water absorbing state can also be reduced.

The polyethylene resin (B) is preferably a mixture of an acid-denatured polyethylene resin (B1) and an undenatured polyethylene resin (B2). Using the mixture of (B1) and (B2) as the polyethylene resin (B) is preferred since the reactivity with the polyamide 610 resin (A) is improved and the transparency is enhanced.

The acid-denatured polyethylene resin (B1) refers to a polyethylene resin denatured with maleic anhydride or a carboxylic acid. The density of the acid-denatured polyethylene resin (B1) is not particularly limited, and is preferably 940 kg/m$^3$ or more, which is classified as a high-density polyethylene resin, from the viewpoint of improving the transparency when mixed with the polyamide 610 resin (A). The molecular weight of the acid-denatured polyethylene resin (B1) is not particularly limited. The density of the acid-denatured polyethylene resin is preferably 980 kg/m$^3$ or less.

The acid-denaturation amount of the acid-denatured polyethylene resin (B1) is not particularly limited, and it is preferable that the acid value measured using xylene as a solvent in accordance with JIS K 0070 (1992) is 3.0 mgKOH/g to 10.0 mgKOH/g.

The undenatured polyethylene resin (B2) refers to a polyethylene resin that is not subjected to a process such as acid denaturation. The density of the undenatured polyethylene resin is not particularly limited, and is preferably 940 kg/m$^3$ or more, which is classified as a high-density polyethylene resin, from the viewpoint of improving the transparency when mixed with the polyamide 610 resin. The density of the undenatured polyethylene resin is preferably 980 kg/m$^3$ or less.

In the polyamide resin composition forming the alkaline battery gasket, when the total amount of the polyamide 610 resin (A) and the polyethylene resin (B) is regarded as 100 parts by weight, the blending amount of the polyamide 610 resin (A) is 50 to 95 parts by weight, and the blending amount of the polyethylene resin (B) is 5 to 50 parts by weight. The polyamide 610 resin (A) being less than 50 parts by weight is not preferred since the compatibility between the polyamide 610 resin (A) and the polyethylene resin (B) deteriorates, and appearance defects such as deterioration of the transparency of the gasket and whitening due to peeling of the polyamide phase and the polyethylene phase are likely to occur. On the other hand, the polyamide 610 resin (A) being more than 95 parts by weight is not preferred since the water absorption rate when forming the gasket cannot be sufficiently reduced, and the difference in burst strength between an absolutely dry state and a water absorbing state is increased.

From the viewpoints of improving the reactivity with the polyamide 610 resin (A), improving the transparency and improving the appearance of the gasket, the blending ratio of the acid-denatured polyethylene resin (B1) is preferably 10 to 95 parts by weight, and more preferably 20 to 70 parts by weight, when the total amount of the polyethylene resin (B) is regarded as 100 parts by weight. In addition, the blending ratio of the undenatured polyethylene resin (B2) is preferably 5 to 90 parts by weight, and more preferably 30 to 80 parts by weight, when the total amount of the polyethylene resin (B) is regarded as 100 parts by weight.

The morphology of the polyamide resin composition forming the alkaline battery gasket can be observed by using a transmission electron tomography (TEM), in which the polyamide 610 resin (A) forms a continuous phase, the polyethylene resin (B) forms a dispersed phase, and the average dispersion diameter of the dispersed phase of the polyethylene resin (B) is 1 nm or more and 1000 nm or less. The average dispersion diameter of the dispersed phase being more than 1000 nm leads to an appearance defect of whitening due to deterioration of transparency of the gasket and phase peeling. Further, since the composition of the gasket is not uniform, the burst strength of the gasket varies. In addition, the average dispersion diameter of the dispersed phase being less than 1 nm is not preferred since the heat resistance of the gasket is lowered. The following applies to morphology observation using TEM. In general, the morphology in a thermoplastic resin composition maintains the morphology even after melt forming. Therefore, in our gaskets, the morphology is observed using a formed body obtained by injection forming the polyamide resin composition. That is, a center in a cross-sectional direction of the ASTM4 tensile test piece obtained by injection forming at a cylinder temperature of the melting point of the polyamide resin +50° C. is cut into 1 to 2 mm square, and the polyamide resin is stained with phosphotungstic acid and osmium. Then, an ultrathin section of 0.1 μm or less (about 80 nm) is cut at −196° C. with an ultramicrotome, magnified 5000 times, and observed with a transmission electron microscope (model number: H-7100) manufactured by Hitachi, Ltd. The obtained image is analyzed using analysis software "Image-Pro" manufactured by Nippon Roper K. K. The white area is the polyethylene phase, and the "area length" is the average dispersion diameter of the dispersed phase.

The method of setting the average dispersion diameter of the polyethylene resin (B) to be 1 nm or more and less than 1000 nm is not particularly limited. An example method is that, when the total amount of the polyamide 610 resin (A) and the polyethylene resin (B) is 100 parts by weight, the blending amount of the polyamide 610 resin (A) is 50 to 95 parts by weight, the blending amount of the polyethylene resin (B) is 5 to 50 parts by weight, the polyethylene resin (B) is a mixture of the acid-denatured polyethylene resin (B1) and the undenatured polyethylene resin (B2), and the blending ratio of the acid-denatured polyethylene resin (B1) is 10 to 95 parts by weight when the total amount of the polyethylene resin (B) is regarded as 100 parts by weight.

The resin composition forming the alkaline battery gasket may contain components other than the polyamide 610 resin (A) and the polyethylene resin (B) as long as the desired characteristics are not impaired. For example, a thermoplastic resin other than the resins (A) and (B) may be contained as other components. Examples of the thermoplastic resin include a polyamide resin other than the polyamide 610 resin (A), a polyester resin, a polyphenylene sulfide resin, a polyphenylene oxide resin, a polycarbonate resin, a polylactic acid resin, a polyacetal resin, a polysulfone resin, a tetrafluoride polyethylene resin, a polyetherimide resin, a polyamideimide resin, a polyimide resin, a polyethersulfone resin, a polyetherketone resin, a polythioether ketone resin, a polyether ether ketone resin, styrene resins such as a polystyrene resin and an ABS resin, and a polyalkylene oxide resin.

When the thermoplastic resin is used, the content thereof is not limited, and is preferably 0.1 part by weight or more and less than 10 parts by weight with respect to 100 parts by weight of the total amount of the polyamide 610 resin (A) and the polyethylene resin (B).

As other components, one or more ordinary additives such as an ultraviolet absorber, a crystal nucleating agent, an anti-coloring agent, a weathering agent, a release agent, a lubricant, and an antistatic agent may be added as long as the desired effect is not impaired.

Examples of the additive include: benzotriazole-based, phenol-based, and phosphorus-based ultraviolet absorbers; crystal nucleating agents containing organic nucleating agents such as metal salts of an aromatic carboxylic acid, a sorbitol derivative, an organic phosphate, and an aromatic amide compound and inorganic nucleating agents such as talc, boron nitride and other silicate metal salts; resorcinol-based, salicylate-based, benzotriazole-based, benzophenone-based, and hindered amine-based weathering agents; release agents such as a stearic acid metal salt, an aliphatic alcohol, an aliphatic amide, an aliphatic bisamide, ethylene bisstearyl amide and a higher fatty acid ester; lubricants such as octyl p-oxybenzoate and wax; and alkyl sulfate anionic, quaternary ammonium salt cationic, nonionic (such as polyoxyethylene sorbitan monostearate), and betaine-based amphoteric antistatic agents. Among these, a crystal nucleating agent and a release agent are preferred from the viewpoint of forming processability. The content of the crystal nucleating agent is preferably 0.01 parts by weight or more and less than 5 parts by weight, when the total amount of the polyamide 610 resin (A) and the polyethylene resin (B) is regarded as 100 parts by weight. The content of the release agent is preferably 0.1 parts by weight or more and less than 3 parts by weight.

It is possible to use two or more kinds of additives such as an ultraviolet absorber, a crystal nucleating agent, an anti-coloring agent, a weathering agent, a release agent, a lubricant, and an antistatic agent. The content thereof is not particularly limited, and is preferably 0.01 parts by weight or more and less than 5 parts by weight with respect to 100 parts by weight of the polyamide 610 resin (A).

From the viewpoint of light weight, the density of the alkaline battery gasket including the polyamide resin composition is preferably 1000 kg/m³ or more and 1070 kg/m³ or less. To prevent leakage of the electrolyte of the alkaline battery due to heat generation caused by a battery short, the melting point of the alkaline battery gasket including the polyamide resin composition is preferably 210° C. or higher and 280° C. or lower. To improve the detection accuracy for foreign matters in the step of inspecting foreign matters and air bubbles in the gasket, the haze of the ASTM4 tensile test piece made of the polyamide resin composition is preferably less than 90%, and particularly preferably less than 80%. The lower limit of the haze is not particularly limited, and is 0% according to its definition.

The method of producing the resin composition forming the alkaline battery gasket is not particularly limited as long as the polyamide 610 resin (A) and the polyethylene resin (B) can be melted and mixed. As the production method, melt kneading using a twin-screw extruder is usually preferably used from the viewpoints of productivity and kneading. Examples of the melt-kneading method using a twin-screw extruder include a method of premixing the polyamide 610 resin (A), the polyethylene resin (B) and, if necessary, components other than (A) and (B), supplying the mixture to a twin-screw extruder whose cylinder temperature is set to 230° C. to 300° C., and performing melt-kneading. The order of mixing the raw materials is not particularly limited. A method of melt-kneading all raw materials by the above method, a method of melt-kneading some raw materials by the above method and then melt-kneading the remaining raw materials, or a method of mixing remaining raw materials using a side feeder while melt-kneading some raw materials may be used. The screw configuration preferably has 1 to 5 kneading zones. When the ratio (%) of the total length of the kneading zone to the total length of the screw is defined as (total length of kneading zone)/(total length of screw)×100, it is preferably 5% to 40%. A method of removing the gas generated by exposing to a vacuum state in the middle of the extruder is also preferably used. The resin composition extruded after melt-kneading is usually taken up in the form of strands and processed into pellets by a pelletizer.

The method of producing the alkaline battery gasket is not particularly limited, and there is no problem as long as it is a normal thermoplastic resin processing method, and an injection forming method having high dimensional accuracy of the product and excellent productivity is usually preferably used.

EXAMPLES

Next, our gaskets will be specifically described based on Examples. This disclosure is not limited to the following Examples. The evaluation methods for various characteristics in Examples are as follows.

(1) Density of Gasket

The measurement was carried out by the density gradient tube method using a relative density liquid prepared from carbon tetrachloride and toluene using an alkaline battery gasket obtained by injection forming at a cylinder temperature of the melting point of the polyamide resin +50° C.

(2) Melting Point of Gasket

The measurement was carried out by a differential scanning calorimeter (product number: DSC8000) manufactured by PerkinElmer, Inc. using an alkaline battery gasket obtained by injection forming at a cylinder temperature of the melting point of the polyamide resin +50° C.

(3) Average Dispersion Diameter of Dispersed Phase

A center in a cross-sectional direction of the ASTM4 tensile test piece (test piece of gasket) obtained by injection forming at a cylinder temperature of the melting point of the polyamide resin+50° C. was cut into 1 to 2 mm square, and the polyamide resin was stained with phosphotungstic acid and osmium. Then, an ultrathin section of 0.1 μm or less (about 80 nm) was cut at −196° C. with an ultramicrotome, magnified 5000 times, and observed with a transmission electron microscope (model number: H-7100) manufactured by Hitachi, Ltd. The obtained image was analyzed using analysis software "Image-Pro" manufactured by Nippon Roper K. K. The white area was the polyethylene phase, and the "area length" was the average dispersion diameter of the dispersed phase.

(4) Transparency

The haze (cloudiness) was measured using a direct reading haze meter manufactured by Toyo Seiki Co., Ltd. for the ASTM4 tensile test piece obtained by injection forming at a cylinder temperature of the melting point of the polyamide resin +50° C. A haze of less than 80% was determined to be very good transparency (indicated with A in the table), a haze of 80% or more and less than 90% was determined to be good transparency (indicated with B in the table), and a haze of 90% or more was determined to be poor transparency (indicated with C in the table).

(5) Appearance of Formed Product

The alkaline battery gasket obtained by injection forming at a cylinder temperature of the melting point of the polyamide resin +50° C. was visually confirmed and evaluated for the presence or absence of whitening caused by peeling.

(6) Burst Strength

Using a dedicated fracture pressure measuring instrument, an internal pressure was applied by air pressure to an alkaline battery gasket having a thin part thickness of 0.25 mm obtained by injection forming at a cylinder temperature of the melting point of the polyamide resin +50° C., and the displayed value of the pressure gauge at the highest point just before the thin part of the gasket broke was recorded as the burst strength. The value measured within 1 hour after forming the gasket was defined as the burst strength (a) in an absolutely dry state, and the value measured after being immersed in hot water of 80° C. for 1 hour as a water absorption treatment and then naturally dried in the air for 1 hour was defined as the burst strength (b) in a water absorbing state. The difference in strength between an absolutely dry state and a water absorbing state was calculated according to the formula (a)-(b), and the rate of decrease in strength due to water absorption was calculated according to the formula {(a)-(b)}/(a)×100 (%).

(7) Alkaline Resistance

A tensile test was conducted on the ASTM4 tensile test piece (test piece of gasket) obtained by injection forming at a cylinder temperature of the melting point of the polyamide resin +50° C. before and after an immersion treatment in a 25% KOH aqueous solution at 70° C. for 10 weeks. Tensile strength after immersion being 75% or more as compared with that before immersion was determined as good (indicated with A in the table), and tensile strength after immersion being less than 75% was determined as poor (indicated with B in the table).

The raw materials of the resin compositions used in Examples and Comparative Examples are as follows:

- (A-1): polyamide 610 resin having a melting point of 221° C. and a viscosity of 112 ml/g measured in accordance with JIS K 6933 (2013).
- (A-2): polyamide 610 resin having a melting point of 221° C. and a viscosity of 98 ml/g measured in accordance with JIS K 6933 (2013).
- (A-3): polyamide 610 resin having a melting point of 221° C. and a viscosity of 78 ml/g measured in accordance with JIS K 6933 (2013).
- (A-4): polyamide 610 resin having a melting point of 221° C. and a viscosity of 132 ml/g measured in accordance with JIS K 6933 (2013).
- (B1-1): acid-denatured polyethylene resin "ADMER HE810" having a density of 960 kg/m$^3$ and an acid value of 7.4 mgKOH/g (manufactured by Mitsui Chemicals, Inc.).
- (B2-1): high density polyethylene resin "HI-ZEX 1300J" having a density of 960 kg/m$^3$ (manufactured by Prime Polymer Co, Ltd.).
- (B2-2): linear low density polyethylene resin "Evolue SP1071" having a density of 910 kg/m$^3$ (manufactured by Prime Polymer Co, Ltd.).
- (B2-3): low density polyethylene resin "UBE J-1019" having a density of 920 kg/m$^3$ (manufactured by UBE Corporation).
- (C-1): polyamide 612 resin having a melting point of 215° C. and a viscosity of 88 ml/g measured in accordance with JIS K 6933 (2013).
- (C-2): polyamide 66 resin having a melting point of 262° C. and a viscosity of 112 ml/g measured in accordance with JIS K 6933 (2013).
- (C-3): polyamide 11 resin having a melting point of 189° C. and a viscosity of 110 ml/g measured in accordance with JIS K 6933 (2013).
- (D-1): block copolymer resin of propylene and ethylene "Prime Polypro E702MG" (manufactured by Prime Polymer Co, Ltd.).
- (D-2): polypropylene resin "Prime Polypro E111G" (manufactured by Prime Polymer Co., Ltd.).
- (E-1): crystal nucleating agent: talc "Micron White #7000" (manufactured by HAYASHI KASEI Co., Ltd).
- (E-2): crystal nucleating agent: magnesium silicate (manufactured by FUJIFILM Wako Pure Chemical Corporation).
- (F-1): release agent: "Loxiol G78" (manufactured by Emery Oleochemicals).
- (F-2): release agent: magnesium stearate (manufactured by FUJIFILM Wako Pure Chemical Corporation).
- (G-1): maleic anhydride "M0005" (manufactured by Tokyo Chemical Industry Co., Ltd.).
- (G-2): radical generator "Sunperox TY-1.3-8" (manufactured by Sanken Chemical Co., Ltd.).

Examples 1 to 9 and Comparative Examples 1 to 4 and 7 to 12

Raw materials were charged from a raw material supply port upstream of a twin-screw extruder with the composition shown in Tables 1 and 2 and melt-kneaded, and the extruded strands were pelletized to obtain a pellet-shaped resin composition. As the twin-screw extruder, TEX30α manufactured by The Japan Steel Works, Ltd. was used, and melt kneading was performed at a cylinder temperature of 260° C., a screw rotation speed of 200 rpm, and a discharge rate of 40 kg/hr. The pellets of the obtained resin composition were vacuum dried at 80° C. for 12 hours or longer, and then injection forming was performed under the conditions of a cylinder temperature of melting point +50° C. and a mold temperature of 80° C. to obtain an alkaline battery gasket. Further, another mold was used under the same conditions to obtain an ASTM4 tensile test piece. Density measurement, melting point measurement, formed product appearance confirmation, and burst strength measurement were performed on the obtained gasket, and average dispersion diameter measurement, transparency measurement, and alkaline resistance evaluation were performed on the ASTM4 tensile test piece using a transmission electron tomography.

Comparative Example 5

Melt kneading, injection forming, and evaluation were performed in the same manner as in Example 1 except that the cylinder temperature was set to 280° C. for melt kneading.

Comparative Example 6

Melt kneading, injection forming, and evaluation were performed in the same manner as in Example 1 except that the cylinder temperature was set to 230° C. for melt kneading.

In Examples 1 to 9, a gasket having excellent light weight, good dispersion of the polyethylene resin in the polyamide 610 resin, and excellent transparency and appearance of the formed product is obtained. In addition, the burst strength of the obtained gasket changes little between an absolutely dry state and a water absorbing state, and the alkaline resistance is also excellent.

It can be seen that the gasket in Comparative Example 1 has a large change in burst strength due to water absorption, and is poor in stability of the operating pressure of the safety valve compared to our Examples.

In Comparative Examples 2 to 4, the average dispersion diameter of polyethylene is large, the transparency is deteriorated as compared with Examples, and the obtained gasket surface has appearance defects caused by phase peeling.

In Comparative Example 5, the transparency and the alkaline resistance are poor as compared with Example 2, and in Comparative Example 6, the heat resistance and the transparency are poor as compared with Example 2. In Comparative Example 7, the rate of decrease in burst strength due to water absorption is poor.

In Comparative Example 8, the change in burst strength due to water absorption is large, in Comparative Example 9 and Comparative Example 10, the dispersion diameter of polypropylene is large, and the transparency and the appearance of the formed product are deteriorated compared to our Examples.

It can be seen that the transparency in Comparative Example 11 and Comparative Example 12 is worse than that of our Examples.

Thus, it can be seen that the gaskets obtained from the resin compositions in Examples 1 to 9 are excellent in light weight, transparency and appearance of formed products, and also excellent in alkaline resistance and heat resistance. In addition, it can be seen that the difference in burst strength between an absolutely dry state and a water absorbing state is small, and the stability of the operating pressure of the safety valve is high when using the gaskets in alkaline batteries.

TABLE 1

| | | | | Ex. 1 | Ex. 2 | Ex. 3 | Ex. 4 | Ex. 5 |
|---|---|---|---|---|---|---|---|---|
| Polyamide 610 resin (A) | | A-1 | part by weight | 90 | 70 | 60 | 50 | 70 |
| | | A-2 | part by weight | | | | | |
| | | A-3 | part by weight | | | | | |
| | | A-4 | part by weight | | | | | |
| Polyethylene resin (B) | Denatured polyethylene resin | B1-1 | part by weight | 2 | 10 | 13.3 | 16.7 | 10 |
| | Undenatured polyethylene resin | B2-1 | part by weight | 8 | 20 | 26.7 | 33.3 | |
| | | B2-2 | part by weight | | | | | 20 |
| | | B2-3 | part by weight | | | | | |
| Other components | Polyamide resin (other than polyamide 610 resin) | C-1 | part by weight | | | | | |
| | | C-2 | part by weight | | | | | |
| | | C-3 | part by weight | | | | | |
| | Polypropylene resin | D-1 | part by weight | | | | | |
| | | D-2 | part by weight | | | | | |
| | Crystal nucleating agent | E-1 | part by weight | 0.05 | 0.05 | 0.05 | 0.05 | 0.05 |
| | | E-2 | part by weight | | | | | |
| | Release agent | F-1 | part by weight | 0.30 | 0.30 | 0.30 | 0.30 | 0.30 |
| | | F-2 | part by weight | | | | | |
| | Additive | G-1 | part by weight | | | | | |
| | | G-2 | part by weight | | | | | |
| Material characteristic | | Viscosity of polyamide resin | ml/g | 112 | 112 | 112 | 112 | 112 |
| | | Density of acid-denatured polyethylene resin (B1) | kg/m$^3$ | 960 | 960 | 960 | 960 | 960 |
| | | Density of undenatured polyethylene resin (B2) | kg/m$^3$ | 960 | 960 | 960 | 960 | 910 |
| Characteristic of alkaline battery gasket | Density | — | kg/m$^3$ | 1070 | 1041 | 1029 | 1016 | 1037 |
| | Melting point | — | ° C. | 221 | 221 | 221 | 221 | 221 |
| | Morphology | Average dispersion diameter of dispersed phase | nm | 190 | 215 | 280 | 531 | 214 |
| | Transparency | Haze measurement (ASTM4) | % | 71 | 75 | 81 | 84 | 84 |
| | | | — | A | A | B | B | B |
| | Appearance of formed product | Phase peeling of battery gasket | — | No | No | No | No | No |
| | Burst strength | Absolutely dry state | MPa | 9.4 | 10.1 | 10.3 | 10.5 | 10.0 |
| | | Water absorbing state | MPa | 7.6 | 8.8 | 9.2 | 9.7 | 8.7 |
| | | Difference in burst strength between absolutely dry state and water absorbing state | MPa | 1.8 | 1.3 | 1.1 | 0.8 | 1.3 |
| | | Decrease in strength due to water absorption | % | 19 | 13 | 11 | 8 | 13 |
| | Alkaline resistance | — | — | A | A | A | A | A |

| | | | | Ex. 6 | Ex. 7 | Ex. 8 | Ex. 9 |
|---|---|---|---|---|---|---|---|
| Polyamide 610 resin (A) | | A-1 | part by weight | 70 | | | |
| | | A-2 | part by weight | | 70 | | |
| | | A-3 | part by weight | | | 70 | |
| | | A-4 | part by weight | | | | 70 |
| Polyethylene resin (B) | Denatured polyethylene resin | B1-1 | part by weight | 10 | 10 | 10 | 10 |
| | Undenatured polyethylene resin | B2-1 | part by weight | | | 20 | 20 |
| | | B2-2 | part by weight | | 20 | | |
| | | B2-3 | part by weight | 20 | | | |
| Other components | Polyamide resin (other than polyamide 610 resin) | C-1 | part by weight | | | | |
| | | C-2 | part by weight | | | | |
| | | C-3 | part by weight | | | | |

TABLE 1-continued

|  |  |  |  |  |  |  |  |
|---|---|---|---|---|---|---|---|
|  | Polypropylene resin | D-1 | part by weight |  |  |  |  |
|  |  | D-2 | part by weight |  |  |  |  |
|  | Crystal nucleating agent | E-1 | part by weight | 0.05 | 0.05 | 0.05 | 0.05 |
|  |  | E-2 | part by weight |  |  |  |  |
|  | Release agent | F-1 | part by weight | 0.30 | 0.30 | 0.30 | 0.30 |
|  |  | F-2 | part by weight |  |  |  |  |
|  | Additive | G-1 | part by weight |  |  |  |  |
|  |  | G-2 | part by weight |  |  |  |  |
| Material characteristic |  | Viscosity of polyamide resin | ml/g | 112 | 98 | 78 | 132 |
|  |  | Density of acid-denatured polyethylene resin (B1) | kg/m$^3$ | 960 | 960 | 960 | 960 |
|  |  | Density of undenatured polyethylene resin (B2) | kg/m$^3$ | 920 | 960 | 960 | 960 |
| Characteristic of alkaline battery gasket | Density | — | kg/m$^3$ | 1039 | 1042 | 1041 | 1042 |
|  | Melting point | — | °C. | 221 | 221 | 221 | 221 |
|  | Morphology | Average dispersion diameter of dispersed phase | nm | 179 | 229 | 340 | 235 |
|  | Transparency | Haze measurement (ASTM4) | % | 83 | 78 | 80 | 76 |
|  |  |  | — | B | A | B | A |
|  | Appearance of formed product | Phase peeling of battery gasket | — | No | No | No | No |
|  | Burst strength | Absolutely dry state | MPa | 10.1 | 7.7 | 5.9 | 13.6 |
|  |  | Water absorbing state | MPa | 8.8 | 6.8 | 5.3 | 11.7 |
|  |  | Difference in burst strength between absolutely dry state and water absorbing state | MPa | 1.3 | 0.9 | 0.6 | 1.9 |
|  |  | Decrease in strength due to water absorption | % | 13 | 12 | 10 | 14 |
|  | Alkaline resistance | — | — | A | A | A | A |

TABLE 2

|  |  |  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| Polyamide 610 resin (A) |  |  | A-1 | part by weight | 100 | 40 | 70 | 50 |  |  |
|  |  |  | A-2 | part by weight |  |  |  |  |  |  |
|  |  |  | A-3 | part by weight |  |  |  |  |  |  |
|  |  |  | A-4 | part by weight |  |  |  |  |  |  |
| Polyethylene resin (B) | Denatured polyethylene resin |  | B1-1 | part by weight |  | 20 |  |  | 10 | 10 |
|  | Undenatured polyethylene resin |  | B2-1 | part by weight |  | 40 | 30 | 50 | 20 | 20 |
|  |  |  | B2-2 | part by weight |  |  |  |  |  |  |
|  |  |  | B2-3 | part by weight |  |  |  |  |  |  |
| Other components | Polyamide resin (other than polyamide 610 resin) |  | C-1 | part by weight |  |  |  |  |  |  |
|  |  |  | C-2 | part by weight |  |  |  |  | 70 |  |
|  |  |  | C-3 | part by weight |  |  |  |  |  | 70 |
|  | Polypropylene resin |  | D-1 | part by weight |  |  |  |  |  |  |
|  |  |  | D-2 | part by weight |  |  |  |  |  |  |
|  | Crystal nucleating agent |  | E-1 | part by weight | 0.05 | 0.05 | 0.05 | 0.05 | 0.05 | 0.05 |
|  |  |  | E-2 | part by weight |  |  |  |  |  |  |
|  | Release agent |  | F-1 | part by weight | 0.30 | 0.30 | 0.30 | 0.30 | 0.30 | 0.30 |
|  |  |  | F-2 | part by weight |  |  |  |  |  |  |
|  | Additive |  | G-1 | part by weight |  |  |  |  |  |  |
|  |  |  | G-2 | part by weight |  |  |  |  |  |  |
| Material characteristic |  |  | Viscosity of polyamide resin | ml/g | 112 | 112 | 112 | 112 | 112 | 110 |
|  |  |  | Density of acid-denatured polyethylene resin (B1) | kg/m$^3$ | — | 960 | — | — | 960 | 960 |
|  |  |  | Density of undenatured polyethylene resin (B2) | kg/m$^3$ | — | 960 | 960 | 960 | 960 | 960 |
| Characteristic of alkaline battery gasket | Density |  | — | kg/m$^3$ | 1090 | 1005 | 1041 | 1016 | 1079 | 1010 |
|  | Melting point |  | — | °C. | 221 | 221 | 221 | 221 | 262 | 189 |
|  | Morphology |  | Average dispersion diameter of dispersed phase | nm | — | 1331 | 1243 | 2290 | 244 | 540 |
|  | Transparency |  | Haze measurement (ASTM4) | % | 66 | 90 | 93 | 95 | 87 | 91 |
|  |  |  |  | — | A | C | C | C | B | C |
|  | Appearance of formed product |  | Phase peeling of battery gasket | — | — | Yes | Yes | Yes | No | No |
|  | Burst strength |  | Absolutely dry state | MPa | 8.6 | 10.7 | 10.4 | 10.9 | 11.0 | 16.6 |
|  |  |  | Water absorbing state | MPa | 6.4 | 10.0 | 8.8 | 9.8 | 7.7 | 14.7 |
|  |  |  | Difference in burst strength between absolutely dry state and water absorbing state | MPa | 2.2 | 0.7 | 1.6 | 1.1 | 3.3 | 1.9 |
|  |  |  | Decrease in strength due to water absorption | % | 26 | 7 | 15 | 10 | 30 | 11 |
|  | Alkaline resistance |  | — | — | A | A | A | A | B | A |

TABLE 2-continued

| | | | | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|
| Polyamide 610 resin (A) | | A-1 | part by weight | | | | 70 | 70 | 70 |
| | | A-2 | part by weight | | | | | | |
| | | A-3 | part by weight | | | | | | |
| | | A-4 | part by weight | | 100 | | | | |
| Polyethylene resin (B) | Denatured polyethylene resin | B1-1 | part by weight | | | | | | |
| | Undenatured polyethylene resin | B2-1 | part by weight | | | | | | |
| | | B2-2 | part by weight | | | | | | |
| | | B2-3 | part by weight | | | | | | |
| Other components | Polyamide resin (other than polyamide 610 resin) | C-1 | part by weight | 100 | | 70 | | | |
| | | C-2 | part by weight | | | | | | |
| | | C-3 | part by weight | | | | | | |
| | Polypropylene resin | D-1 | part by weight | | | | | | 30 |
| | | D-2 | part by weight | | | 30 | 30 | 30 | |
| | Crystal nucleating agent | E-1 | part by weight | 0.05 | | | | | |
| | | E-2 | part by weight | | 0.30 | | | | |
| | Release agent | F-1 | part by weight | 0.30 | | | | | |
| | | F-2 | part by weight | | 0.50 | | | | |
| | Additive | G-1 | part by weight | | | | | 0.33 | 0.2 |
| | | G-2 | part by weight | | | | | 0.49 | 0.3 |
| Material characteristic | | Viscosity of polyamide resin | ml/g | 88 | 132 | 88 | 112 | 112 | 112 |
| | | Density of acid-denatured polyethylene resin (B1) | kg/m³ | — | — | — | — | — | — |
| | | Density of undenatured polyethylene resin (B2) | kg/m³ | — | — | — | — | — | — |
| Characteristic of alkaline battery gasket | Density | — | kg/m³ | 1070 | 1090 | 1036 | 1040 | 1040 | 1040 |
| | Melting point | — | °C. | 215 | 221 | 215 | 221 | 221 | 221 |
| | Morphology | Average dispersion diameter of dispersed phase | nm | — | — | 1948 | 1543 | 702 | 650 |
| | Transparency | Haze measurement (ASTM4) | % | 84 | 72 | 94 | 94 | 93 | 92 |
| | | — | — | B | A | C | C | C | C |
| | Appearance of formed product | Phase peeling of battery gasket | — | No | No | Yes | Yes | Yes | Yes |
| | Burst strength | Absolutely dry state | MPa | 8.4 | 9.0 | 9.1 | 10.1 | 12.0 | 12.5 |
| | | Water absorbing state | MPa | 6.7 | 6.7 | 7.7 | 8.4 | 10.0 | 10.4 |
| | | Difference in burst strength between absolutely dry state and water absorbing state | MPa | 1.7 | 2.3 | 1.4 | 1.7 | 2.0 | 2.1 |
| | | Decrease in strength due to water absorption | % | 20 | 26 | 15 | 17 | 17 | 17 |
| | Alkaline resistance | — | — | A | A | A | A | A | A |

The invention claimed is:

1. An alkaline battery gasket comprising a resin composition in which 50 to 95 parts by weight of a polyamide 610 resin (A) and 5 to 50 parts by weight of a polyethylene resin (B), based on 100 parts by weight of a total amount of the polyamide 610 resin (A) and the polyethylene resin (B), is blended,
   wherein, the polyethylene resin (B) is a mixture of an acid-denatured polyethylene resin (B1) and an undenatured polyethylene resin (B2),
   the undenatured polyethylene resin (B2) has a density of 940 kg/m³ or more,
   wherein, in morphology of the resin composition observed by using transmission electron tomography, the polyamide 610 resin (A) forms a continuous phase, the polyethylene resin (B) forms a dispersed phase, and an average dispersion diameter of the dispersed phase is 1 nm or more and 1000 nm or less; and
   wherein the alkaline battery gasket has a haze value of less than 90%.

2. The alkaline battery gasket according to claim 1, wherein the polyamide 610 resin (A) has a viscosity in a range of 70 ml/g or more and less than 120 ml/g as measured in accordance with JIS K 6933 (2013).

3. An alkaline battery gasket comprising a resin composition in which 50 to 95 parts by weight of a polyamide 610 resin (A) and 5 to 50 parts by weight of a polyethylene resin (B), based on 100 parts by weight of a total amount of the polyamide 610 resin (A) and the polyethylene resin (B), is blended,
   wherein, in morphology of the resin composition observed by using transmission electron tomography, the polyamide 610 resin (A) forms a continuous phase, the polyethylene resin (B) forms a dispersed phase, and an average dispersion diameter of the dispersed phase is 179 nm or more and 1000 nm or less; and
   wherein the alkaline battery gasket has a haze value of less than 90%.

4. An alkaline battery gasket comprising a resin composition in which 50 to 95 parts by weight of a polyamide 610 resin (A) and 5 to 50 parts by weight of a polyethylene resin (B), based on 100 parts by weight of a total amount of the polyamide 610 resin (A) and the polyethylene resin (B), is blended,
   wherein, the polyethylene resin (B) is a mixture of an acid-denatured polyethylene rise (B1) and an undenatured polyethylene resin (B2),
   the undenatured polyethylene resin (B2) has a density of 940 kg/m³ or more, and
   wherein, in morphology of the resin composition observed by using transmission electron tomography, the polyamide 610 resin (A) forms a continuous phase, the polyethylene resin (B) forms a dispersed phase, and an average dispersion diameter of the dispersed phase is 179 nm or more and 1000 nm or less; and wherein the alkaline battery gasket has a haze value of less than 90%.

* * * * *